United States Patent [19]
Lindman

[11] 3,948,774
[45] Apr. 6, 1976

[54] WATER PURIFICATION PROCESS AND APPARATUS

[75] Inventor: William Edward Lindman, Fountain Valley, Calif.

[73] Assignee: Environment Improvement, Inc., Torrance, Calif.

[22] Filed: Oct. 5, 1973

[21] Appl. No.: 403,893

[52] U.S. Cl............... 210/192; 210/195 R; 210/199; 210/202; 210/218; 210/275; 210/512 R; 250/532
[51] Int. Cl.$^2$.......................... C02B 1/20; C02B 1/34
[58] Field of Search............. 23/277 R, 278; 55/173; 110/22 R, 28 R, 28 T; 210/45, 50, 63, 96, 192, 199, 202, 203, 206, 218, 220, 512 R, 275, 195; 250/532, 533, 534, 535, 536, 537, 538, 539; 423/543; 201/36; 202/215, 221, 222

[56] References Cited
UNITED STATES PATENTS

| | | | |
|---|---|---|---|
| 1,381,936 | 6/1921 | Schieffelin | 202/222 X |
| 1,629,352 | 5/1927 | Merriam | 23/278 |
| 2,807,522 | 9/1957 | Russell | 23/278 |
| 2,812,063 | 11/1957 | Pratt | 23/277 X |
| 2,822,327 | 2/1958 | Hammesfahr et al. | 250/532 X |
| 2,882,994 | 4/1959 | Lovelady et al. | 55/173 |
| 3,013,951 | 12/1961 | Mansfield | 201/36 X |
| 3,297,550 | 1/1967 | Alberts | 201/36 X |
| 3,335,080 | 8/1967 | Waller et al. | 250/532 X |
| 3,521,752 | 7/1970 | Lindman | 210/199 X |
| 3,660,277 | 5/1972 | McWhirter et al. | 210/192 X |
| 3,713,543 | 1/1973 | Heaney | 210/275 X |
| 3,739,440 | 6/1973 | Lund et al. | 250/539 X |

*Primary Examiner*—Charles N. Hart
*Assistant Examiner*—Robert H. Spitzer
*Attorney, Agent, or Firm*—Howard L. Johnson

[57] ABSTRACT

Process and apparatus for continuously obtaining separate outflows of pure water and sterile sludge when starting with various aqueous slurries containing organic or oxidizable contaminants (as exemplified by domestic sewage or industrial waste) and first treating the flowing mixture with sulfur dioxide and iron under conditions of closely controlled acidity and in the absence of oxygen. The invention provides a multiple-stage, closed, operating system, a primary segment of which is thus characterized by a self-contained, continuously recycling oxygen-free gaseous flow comprising sulfur dioxide gas which moves through an iron reaction bed concurrent with the contaminant stream. Successive segments include continuously recycled oxygen-containing gas flow and closely monitored step-wise acidity control and utilization of free ions in consecutive neutralization and treating units, including introduction of barium ions by means of which potentially solid components are retained in solution or suspension until reaching the desired flocculation stage. The procedure eliminates such prior difficulties as progressive clogging of the iron reaction bed, calcium deposition in conduits, and premature precipitation as well as undesired retention of soluble components. The sequence includes units for automatic sludge removal, backflush cleansing of alternate filtering units during continued operation of the flow-treatment, use of a non-sparking ozone generator in association with particular air treatment lines, and final purification of exhaust air before venting so that the environment is in no way contaminated by the total operation. Overall assembly can be sized to handle composite waste/refuse of a large community or can be miniaturized so as to accommodate merely the output of a single flush toilet plus that of the garbage grinder of a small apartment or cabin cruiser, which basic unit can be portable and operated by a storage battery. A modified procedure is adapted to treating highly acidic feed stock such as sulfite wood pulp effluent. Sludge may have increased fertilizer value due to phosphate content withdrawn from aqueous phase.

25 Claims, 12 Drawing Figures

WATER PURIFICATION PROCESS AND APPARATUS

BACKGROUND OF THE INVENTION

The interrelated problems of disposing of human and animal sewage as well as industrial liquid-containing waste, and on the other hand of obtaining continuous and abundant supplies of pure water for both human consumption and industrial-agricultural use are so universal and omnipresent as not to require detailing or even enumeration. Although many approaches to the problems have been tried and to limited extents utilized, basic obstacles remain, such as economics of operation, availability of reagents and facilities, disposition of undesirable products from such operation, etc.

A process and apparatus for treating waste water from domestic sewage which employed sulfur dioxide gas and scrap iron for this purpose was disclosed by the present inventor in his U.S. Pat. Nos. 3,521,752 and 3,522,173, both issued July 28, 1970. To a certain extent the present invention may be considered an improvement of the process and apparatus there disclosed. The procedure as then developed, depended upon controlled admixture and regulated acidity obtained in the primary reaction chamber through the use of a horizontally elongated vessel through which the feed stock passed lengthwise while a mixture of gaseous oxygen and sulfur dioxide was concurrently ejected under pressure from perforations of a manifold disposed lengthwise within the chamber. This manifold with its gaseous mixture was continued into a second reaction chamber which contained scrap iron and received the flow of feed stock from the primary chamber. The treated fluid then continued through neutralization, settling and filtering steps.

As shown in the applicant's preceding patents, as well as in the earlier sulfur dioxide-iron oxidative process described by Urbain and Stemen in U.S. Pat. No. 2,171,203, it was considered essential that the gaseous stream of sulfur dioxide include gaseous oxygen (air). Further, problems have arisen by failure to obtain complete oxidation of solid material on the one hand, and alternately of premature precipitation, such as that of oxidized carbon which attaches itself to pieces in the iron bed so as progressively to stifle the flow.

BRIEF STATEMENT OF THE INVENTION

It has now been found that the previously observed, progressive clogging of the iron filter bed can be practically eliminated by the exclusion of oxygen from such reaction chamber. Further, both of the successive treatments with sulfur dioxide and iron can each be advantageously effected, in association with regulated pH, in the absence of gaseous oxygen and in a closed sub-system which continuously recycles the gaseous mixture comprising sulfur dioxide, after its joint passage through this limited segment of the total path which is followed by the feed stock. Such oxygen-free sulfur dioxide, closed recycle system is advantageously employed as an integral part of a self-contained, overall, closed process of step-wise regulated acidity and recycling gaseous oxygen stream, which treatment process starts with aqueous waste and ends with separated sterile sludge and pure water. Such treating apparatus and process can be any size from that required for handling the waste of an entire city to a small compact unit adequate merely for a single flush toilet and garbage disposal such as found in an apartment, cabin cruiser or highway vehicle.

Especially in an industrial-size assembly, particular benefit is obtained by now employing as the primary sulfur dioxide reaction chamber, a spherical cyclone-type reaction or mixing vessel into which a tangentially-directed conduit injects a pressurized mixture of water and sulfur dioxide so as to effect a continuous turbulence therein concurrent with movement of the fluidized feed stock. In other words, the previously used, horizontally elongated, primary reaction vessel with its internal, longitudinally disposed, perforated manifold is no longer required for its previous purpose of obtaining mixing and uniform acidity. The present spherical structure effects a relatively prompt and generally uniform admixture of the reagents and treated material, which mixture, for optimum effectiveness, is now found to require a maintained acidity between about pH 2.4 and 2.6, and desirably below about pH 2.5. Such automatic control is maintained through a pH sensor unit which acts to admit fresh sulfur dioxide to the closed system as required.

Another element is the introduction of barium ions to the flow prior to flocculation, thereby greatly reducing total dissolved solids (TDS) in the purified water. Still another feature resides in a pair of dual filter units having means for backflushing alternate units with accumulated filtered water, which backwash water may then be returned to the preliminary holding tank. Also provided is a non-arcing ozone generator comprising means for passing an air stream through a flat-sided insulating conduit which is located between two plate electrodes which position a high voltage electronic force field across the gas flow. In effect, the ozone thus introduced into the flow stream serves to provide additional oxygen for reaction with organic components by releasing it from metallic compounds formed in the iron and sulfur dioxide treatment. There is also provided means for alternate neutralization of the acid and iron treated feed stock, separately by lime and NaOH; occasional shift to use of the latter serves to decrease or eliminate calcium deposition in conduits subsequent to the lime neutralization step.

While various concurrent reactions occur, the present process particularly profits from the following reactions:

It will be appreciated that sulfur dioxide gas in aqueous medium, such as the initial acid treatment tank (24), becomes sulfurous acid. The latter in the presence of metallic iron is then transformed to ferrous sulfite and free electrons. $O_2+2(H_2SO_3)+2Fe= 2FeSO_3+2H_2O+4e$. Electrons in this mixture, at a final pH of about 3, contribute appreciably to the continuous suspension of ultimately-solid material. At this stage the gaseous mixture withdrawn (for recycle) from atop the iron treatment vessel is a mixture of hydrogen sulfide, carbon dioxide, sulfur dioxide, and water vapor. After neutralization of the oxidized feed supply with lime, the fluid flow is contacted with a gas stream containing gaseous oxygen (which may be supplemented with ozone if available) in order to hold suspended iron and sulfite in solution by conversion to sulfates [$CaSO_4+Fe_2(SO_4)_3$] until the final separation of liquid and solid components in a flocculation chamber.

Advantage is also obtained from use of several closed-circuit air flow streams as more fully detailed hereafter. For simplicity in following, the overall process and corresponding apparatus may be broken down to the following steps which are of course interrelated and not disconnected—

Step 1. Flowable feed stock containing oxidizable material is first passed through a pulverizer/grinder unit when necessary and then pumped into a closed, preliminary agitation-aeration or holding tank where it is intimately contacted with a rising stream of air which may be drawn jointly from the exhaust lines of subsequent treating units such as flocculation tanks and aeration tower. Tank contents usually have an inherent pH range from about 6.0 to about 8.0. A small portion of the circulating air is passed through a wet charcoal filter and vented.

Step 2. Aerated material from the primary holding tank of Step 1 is continuously flow-injected into a spherical, cyclone, acid-treatment tank concurrent with a tangentially-directed rising mixture of sulfur dioxide and water. In response to pH monitor and flow control means, the material in the cyclone tank is maintained at a pH between about 2.4 and about 2.6 by addition of fresh sulfur dioxide from a reservoir as required.

Step 3. The aqueous sulfur dioxide gaseous mixture drawn from the top of the cyclone treatment tank, and the acid-treated feed stock drawn from the bottom thereof are separately injected near the bottom of an iron catalyst tank, and the resulting mixture moves upward through a bed of pieces of scrap iron closely packed within the tank, reaching separate withdrawal levels. As already noted, sulfur dioxide and water react to form sulfurous acid which reacts with iron to form ferrous sulfite plus free electrons.

Step 4. The sulfur dioxide mixture withdrawn from the iron treatment tank is replenished with sulfur dioxide from a supply source as required for Step 2, and the stream is continuously recirculated in a closed system, back to the bottom tangential inlet of the cyclone acid tratment tank, traversing upward, and thence flowing through the iron catalyst tank as noted in Step 3. Such pressurized gas flow is substantially free of gaseous oxygen after start-up since any oxygen present as a component of the air initially in the system is quickly consumed by reaction with the feed stock.

Step 5. The feed stock is conveyed from the top of the iron catalyst tank to the bottom inlet of a neutralizer tank through a conduit containing an injection manifold which is bilaterally connected respectively to a lime slurry feed and to a sodium hydroxide supply. By pH sensor and control means, the contents of the neutralizing tank is maintained approximately at pH 7 by influx of the necessary reagent, as the case may be, and in a subsequent homogenizer sphere, the feed is agitated by vortices created by injection of external air which has been freed of carbon monoxide, carbon dioxide and bicarbonates (by passing through saturated lime water) so as to avoid precipitation of calcium salts. Calcium hydroxide in the tank reacts with sulfurous acid to yield soluble calcium sulfite. ($Ca(OH)_2+H_2SO_3 = CaSO_3+2H_2O$). A gaseous oxygen stream after passage through an ozone producing unit is blown through the fluid in the neutralizing tank and the small amount of precipitate occurring may be conduit-returned to the preliminary holding tank in order to conserve calcium and sodium ions.

Step 6. Processed water removed from the downstream end of the neutralizer tank by means of a weir, is (optionally) passed through a barium ion injection unit to further reduce total dissolved solids (TDS), by their subsequent precipitation in the flocculation tank.

Step 7. Flow is then introduced into a V-bottomed flocculation tank from which sludge is intermittently pumped from a bottom accumulation channel in response to its monitored build-up. This sterile floc can be pumped to a dewatering unit or otherwise processed and/or packaged.

Step 8. Decanted water from the top level of the flocculation tank is introduced to an aerating tank where an ozone- and oxygen-containing gas stream is blown through the fluid, thereby dissolving suspended iron and converting sulfite to calcium sulfate ($CaSO_2 + O_3 = CaSO_4+O_2$). Sediment may be conduit-returned to the primary holding tank.

Step 9. Decanted water from Step 8 is introduced to dual filter/tanks where it gravitationally percolates through a bed of nutshell charcoal on gravel to a dependent reservoir tank. Residual build-up in each of the filters is alternately removed by backflush, operated by electronically-controlled timing means, and backflush liquid being drawn from a reservoir tank of similar decanted water, under (23 pounds) pressure.

Step 10. The filtered water in the reservoir may be aerated by bubbling a stream of gaseous oxygen (or air containing oxygen) therethrough, and the water is then pumped into the top of a packed absorption or scrubbing tower where it percolates down through the closely packed, small tubular baffle-forming segments supplied by cut polyvinyl chloride tubing, while a continuous air current is passed upward in countercurrent flow. The effluent air may be returned to the primary holding tank. The bottom water thus obtained is pure but to comply with public health requirements may additionally be chlorinated if desired.

New sulfur dioxide and ozone generators are each also provided.

MODIFIED PROCESS ADAPTED TO HIGHLY ACIDIC MATERIAL

Such material usually does not require a preliminary sizing or grinding treatment, so it may be flowed directly from a holding/aeration chamber to a sulfur dioxide treating sphere and its associated iron treatment chamber. Such acidic material, as sulfite wood pulp effluent may have a pH as low as 1.8; this would not be lowered by $SO_2$ but the latter is introduced to saturate the fluid and the acid initially present converts it to sulfuric acid. Following successive treatment with iron catalyst, the acidic flow stream is neutralized and then again brought to pH 2.4–2.6 with sulfur dioxide. This among other effects, eliminates coliform bacilli which had flourished in the wood pulp media at pH 1.8 and still after the iron treatment are present as shown by a biochemical oxygen demand (BOD) as high as 18,000. The subsequent flow then follows the post-$SO_2$ steps of the basic sewage/refuse treatment process.

CONTINUOUS FLOW PATTERN AND SUPPORTING APPARATUS

Figure 1:
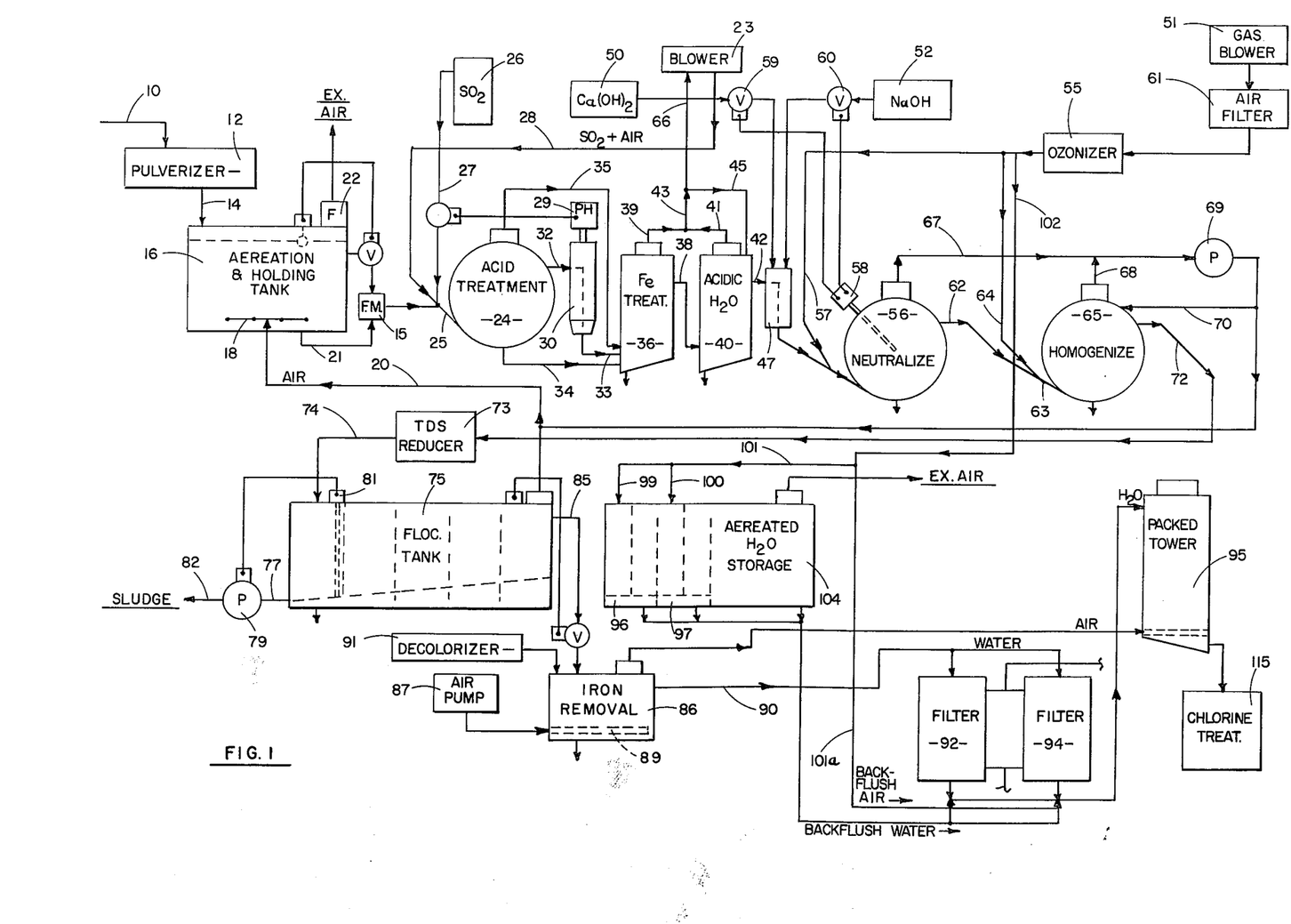
FIG. 1 is a flow diagram of the present process as particularly applied to the treatment of sewage or industrial waste such as has an initial pH of about 6 to about 8.

With particular reference to the apparatus of FIGS. 3–6 and the flow diagram of FIG. 1, the present process and apparatus starts with the flowable feed stock pumped at a continuous rate through a meter-controlled inlet conduit 10 to a flow responsive grinding or pulverizing unit 12 where solid pieces are reduced to a convenient particle size such as 300 mesh. A conduit 14 conveys the fluid from the bottom level of tank 12 into an adajcent, stainless steel, aeration and holding tank 16. The fluid is agitated and aerated by streams or bubbles of air moving upward from a lower gas manifold 18 which is supplied through conduit 20 by incompletely exhausted air returned from the subsequent system and in particular from the flocculation tanks and packed aeration tower. A source of (silicone) foam inhibiting agent is provided by a drop-line connected container 17. A float controlled switch 15 regulates the rate of outlet flow. Inherent hydrogen ion concentration of typical sewage/refuse fluid in the unit 12 ranges from about pH 6.0 to about pH 8.0 without regulation. After passing through the tank 16, a minor portion of the air may be more-or-less continuously exhausted to the atmosphere under, say, 4 lb. pressure through a charcoal-packed filtering unit 22 which is kept moist by a branch of the water line 122 which supplies the lime slurry.

The aerated fluid is then moved by a pump 19 through conduit 21 to a spherical, cyclone-type, acid-treatment chamber 24 into which it is introduced through a tangentially-directed inlet nozzle 25 which simultaneously, from time to time, receives additional sulfur dioxide inflow from a generator or supply tank 26 through conduit 27 and also continuously receives a stream of recirculating gaseous mixture comprising sulfur dioxide moving through the closed $SO_2$ system by way of conduit 28, by action of blower 23 (FIG. 5) and air inlet 46. Introduction of fresh sulfur dioxide from supply reservoir 26 is regulated by an electronic control unit 29 in response to monitoring by pH sensor 30, which control also regulates the flow of new water to the closed system through conduit 31 so as to maintain the churning fluid mixture within the acid treatment tank 24 at pH between about 2.4 and about 2.6. By a bleed line 32, a small flow is continuously withdrawn from the acid tank 24, passed through the pH sensor 30 and introduced by conduit 33 to a subsequent iron treatment chamber 36 which is closely packed with small pieces of scrap iron conveniently sized about ½ by 6 inches (such as used reinforcing rod tips).

The acid-treated feed stock is continuously withdrawn from the $SO_2$ cyclone chamber 24 by a bottom conduit 34 and introduced into the bottom of adjacent tower 36. Simultaneously, the gaseous stream (composed of unreacted sulfur dioxide, oxygen-exhausted air and other gases, including water vapor) is continuously withdrawn from an exhaust bell of the cyclone chamber and conveyed by conduit 35 to a lower injection manifold 37 within the iron treatment chamber 36 where the feed stock and gaseous mixture again intermingle and together move upward through the bed of pieces of metallic iron.

The treated liquid is withdrawn from the acidic iron tank through descending conduit 38 and introduced to an acidic water retention tank 40 which it traverses upward and where its upper surface layer is withdrawn through conduit 42. Gaseous components are withdrawn from the top of the iron treatment tank 36 through conduit 39 and from tank 40 through conduit 41, conveyed jointly through conduit 43 to pressure pump 44 from which part may be returned through conduit 45 to tank 40. The gaseous portion not recycled by pump unit 44 is returned by conduit 66 to the air inlet chamber 46 and blower 23 of the closed sulfur dioxide circulating system.

Figure 4:
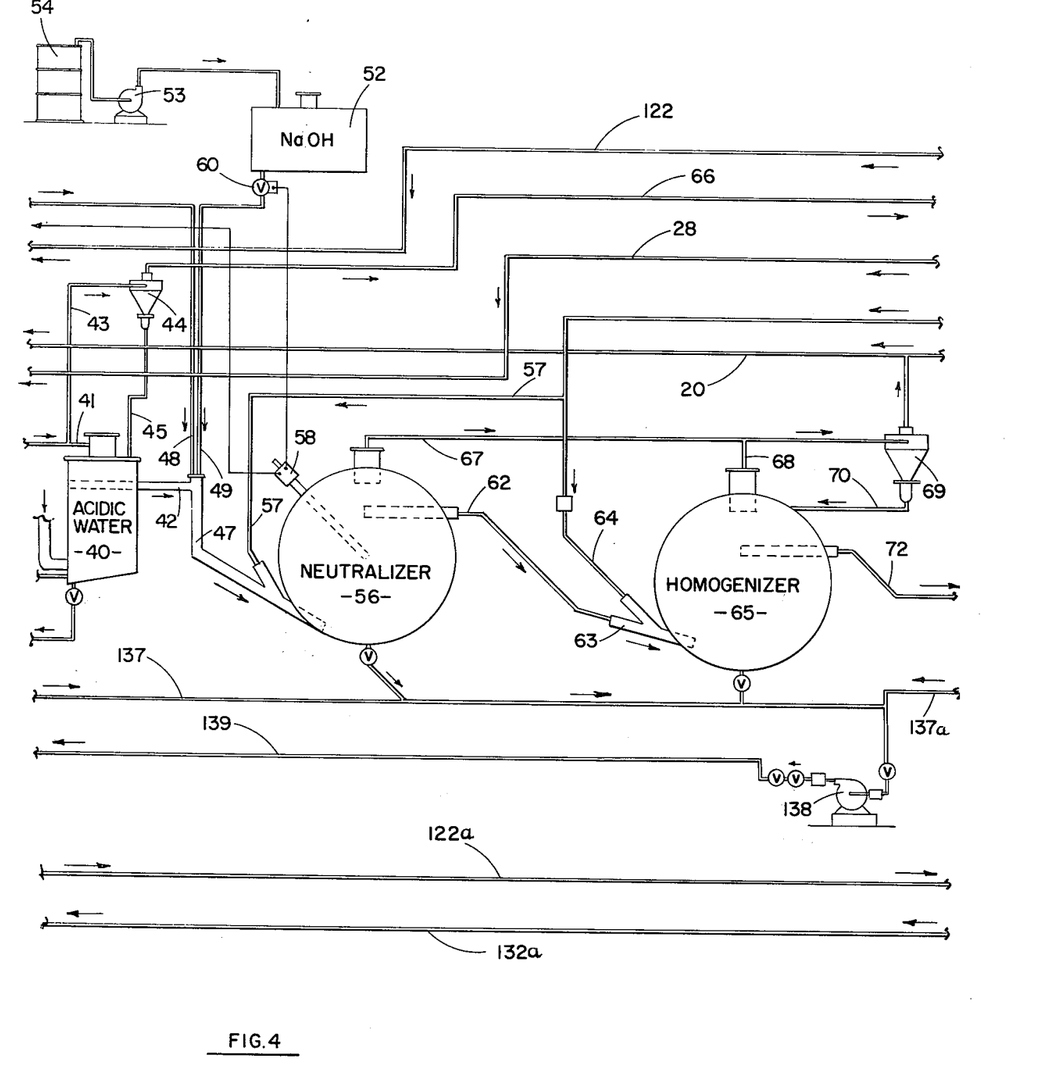

Acidic liquid from conduit 42 enters an inlet throat 47 which is also connected to two small feedlines 48, 49 coming respectively from a lime slurry mixer and container 50 (FIG. 3) and from an aqueous sodium hydroxide storage chamber 52 (FIG. 4). The latter is connected by a line pump 53 to a supply tank 4. The injection inlet 47 conveys the liquid feed into a spherical neutralizng chamber 56 where mixing is effected by turbulence promoted by injection of air through the line 57 (drawn ultimately from ozone/oxygen supply unit 55 by a blower 51) which line angularly intersects the distal segment of the inlet 47. Within the neutralizer 56, a pH sensor unit 58 controls remote switch valves 59, 60 so as to introduce more neutralizer as needed, and the entering air stream is first passed through an air filter 61 consisting of saturated lime water which removes carbon monoxide, carbon dioxide, and bicarbonates, thereby preventing premature flocculation by calcium of the feed flow reacting with them within the neutralizing chamber. During operation of the ozone generator, the unit 61 also scrubs all water vapor from the air after its passage through the limewater, before it enters the electronic force field of the generator.

Liquid is withdrawn from the neutralizer 56 through a conduit 62 and introduced by tangential inlet 63 into a spherical homogenizer 65. As in the previous unit, an air or gaseous ozone/oxygen line 64 angularly joins the tangential inlet 63. Dissolved calcium of the flow stream is oxidized to calcium sulfate. Air is withdrawn from the top of each sphere by the respective lines 67, 68 and drawn to a pump 69 from whence a portion may be returned to the homogenizer 65 by a conduit 70.

Processed water is withdrawn from the homogenizer by the conduit 72 and passed through a TDS reducer 73 wherein barium ions in the form of a slurry of metallic barium is added to the water in a (weight) ratio of about one part per hundred, which flow by conduit 74 is conveyed to a flocculation tank 75. The latter contains several flow-through compartments adapted to facilitate flocculation during a total retention time of approximately ½ to 1 hr. The floc drops to a V-shaped trough-like bottom 76 from which it is withdrawn from time to time by a conduit 77 through action of a pair of sludge pumps 78,79 in response to electronic signal from a sludge depth detector 80 (which is a commercially available unit) conveyed to a remote control unit 81 as by an analog voltage. Sterile sludge is withdrawn through an outlet conduit 82 to drying, storage or packaging facilities as may be required.

Water decanted over a weir is drawn by a pump 84 through a conduit 85 and conveyed to a surge tank 86. A blower 87 moves air through a line 88 into a bottom-level manifold 89 of the surge tank, of which the oxygen serves to oxidatively precipitate suspended iron from the water within the surge tank. Decanted water leaves the tank and gravitationally flows through a conduit 90 to an adjacent pair of filter tanks 92, 94. A supply tank 91 holding decoloring material (such as ammonia or other suitable nitrogenous compound) is conduit-connected to the top of the surge tank. An air escape line 93 connects the top of the surge tank to a subsequent scrubbing tower 95. The dual filter tanks 92, 94 contain beds of nutshell charcoal supported on beds of gravel. Filtered water upon leaving them, gravitationally flows to the first of two aeration tanks 96, 97 through a conduit 98.

Air (containing ozone and oxygen) is blown through the aeration tanks 96, 97 by lines 99, 100 supplied by conduits 101, 102 from an ozone generator or supply unit 55 driven by a blower 51. Clear water from aeration tank 96 passes over a weir into aeration tank 97. Clear water from the latter passes over a weir into the backwash storage tank 104. In response to float switch 111, water is withdrawn from storage tank 104 by pump 105 and conduits 106, 107, and introduced at inlet 108 to the packed aeration tower 95 which is filled with small size units or contact pieces providing large surface area, such as cut polyvinyl chloride tubing having a size of about 1 X 1 inch.

Exhaust air from above the water level in tanks 96, 97, 104 is withdrawn from the bell 109 by line 110 and together with air from line 93 (drawn from surge tank 86) is introduced into a manifold 112 at the base of the packed tower 95 where it moves upward countercurrent to the descending water. Air withdrawn from the bell 113 atop the tower 95 is conveyed through the line 20 to the inlet manifold 18 of the preliminary aeration and holding tank 16 (FIG. 3) propelled by the pump 69 (FIG. 4) which also draws exhaust air from the neutralizing sphere 56 and from the homogenizing sphere 65; the line 20 also draws exhaust air from the flocculation tank 75 by the line 83 (FIG. 5).

From the bottom of the backed tower 95, effluent water moves gravitationally by conduit 114 to a reservoir 115 where it may be batch-treated by chlorine injected from a supply source 116 through conduit 117. After a short treatment period such as 20 minutes, gas is vented through the outlet control 118 and the chlorinated water may be passed through a final charcoal filter bed in tank 119 in order to remove traces of taste and odor. A final water pump 120 is employed to circulate cooling water to pump seals throughout the system when the assembly is a large scale system.

Figure 5:
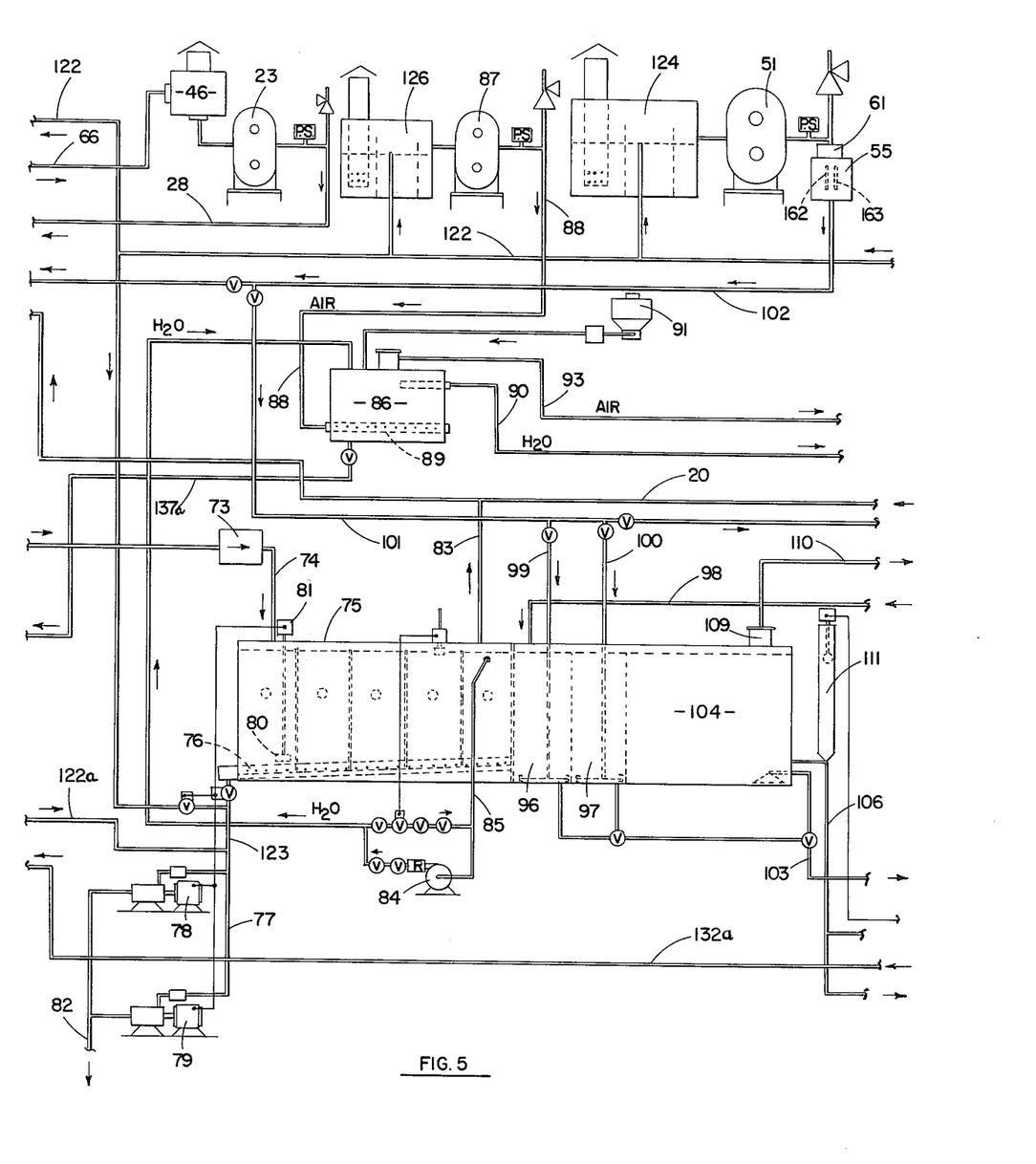
Figure 6:
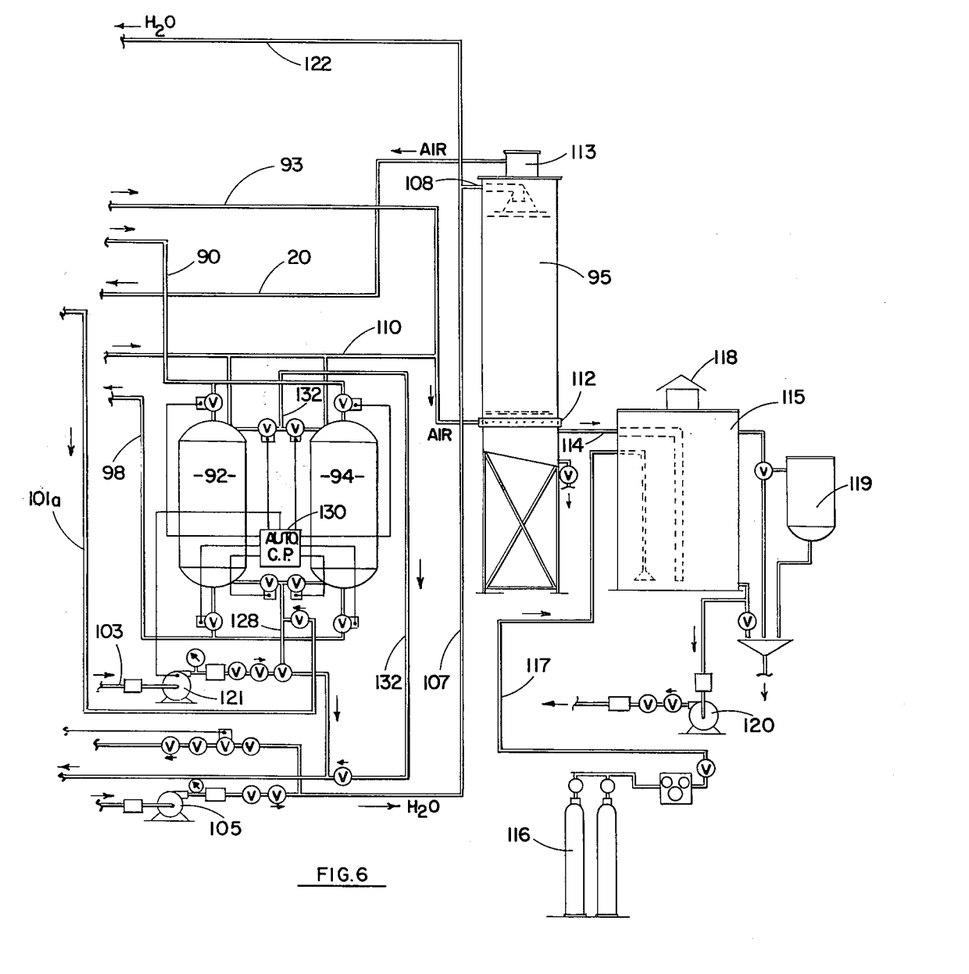
Figure 7:
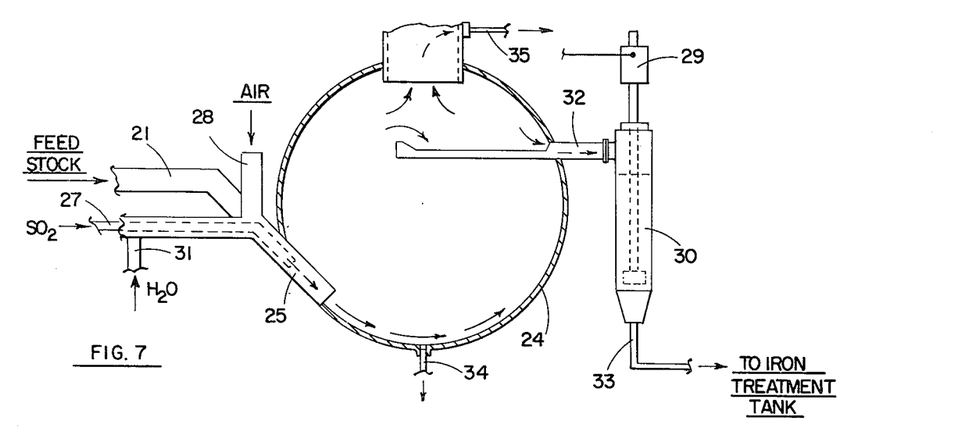
FIG. 7 is an elevational semi-schematic view of the spherical $SO_2$ treating or reaction vessel and flow connections thereof.

The clear water line 122 as a continuation of line 107, beyond the inlet 108 supplies water to air wash units 124, 126 (FIG. 5) which are connected to respective blowers 87, 51, and also supplies make-up water to the lime slurry mixer 50 (FIG. 1) and to exhaust air filter 22, and beyond this it is connected to the aeration/holding tank 16 (line 122a) for occasional flushing of the same, and more distally is connected to the flocculation tank outlet at connection 123 (FIG. 5)

The backwash storage tank 104 (as well as aeration tanks 96, 97) are intermittently drained through conduit 103 and backflush pump 121 (FIG. 6) which by conduit 128 is connected to the bottom of alternate members of the pair of filter tanks 92, 94. In response to an automatic control unit 130, water is admitted by conduit 128 so as to flow upward through the respective filter bed of 92 or 94 and flow out the top of the closed tank by conduit 132 which conveys it (line 132a) to a storage tank 134 (FIG. 3) from which by a pump 135 and conduit 136 it may be returned to the primary tank 16. The limewater-based, air filter tank 61 located upstream from the ozone generator 55 acts to remove gaseous components which would combine with and precipitate calcium. Accordingly, before or after backflushing with water, the filter beds of tanks 92, 94 can be cleaned by upward passage of such an ozone gas stream from line 101a, which is exhausted to line 110. However this is not done when the filter bed contains surface-active adsorbants which are desensitized by ozone.

The great difference between employing the present process on raw sewage at pH 2.5 and 3.0 respectively can be seen from the following comparative data. It will be noted that at the lower pH the total hardness and conductivity, plus the concentrations of potassium, nitrate, phosphate, iron, B.O.D., C.O.D., aluminum and silica were all greatly reduced, while the chloride, ammonia and suspended solids were completely eliminated, as was the coliform bacteria concentration. The latter was unacceptable at pH 3.

|  | 60 hrs. at 5 Gal/min. $SO_2$ at pH 2.5 | | | 50 hrs. at 5 Gal/min. $SO_2$ at pH 3.0 | | |
|---|---|---|---|---|---|---|
|  | initial | Final | Change % | initial | Final | Change % |
| 1. Calcium |  |  |  | 19.2 | 30.4 | 58.3 |
| 2. Magnesium | 6.8 | 6.8 |  | 12.0 | 14.1 | 17.5 |
| 3. Sodium |  |  |  | 38.4 | 38.4 | 0 |
| 4. Potassium | 8.0 | 2.2 | −72.5 | 9.0 | 5.6 | −37.8 |
| 5. Sulfate | 150. | 54.0 | 64.0 | 136.6 | 263.4 | 92.8 |
| 6. Sulfite |  | 0 |  | 0 |  |  |
| 7. Chloride | 22.0 | 0 | −100. | 26.0 | 12.0 | −53.8 |
| 8. Ammonia | 16. | 0 | −100 | 50.0 | 20.0 | −60. |
| 9. Nitrite |  |  |  |  |  |  |
| 10. Nitrate | 30. | 0.5 | −98.5 | 0.7 | 0.2 | −71.4 |
| 11. Phosphate | 232 | 12 | −98. | 4.0 | 2.0 | −50 |
| 12. Iron | 2.0 | 0.1 | −45. | 16.0 | 16.0 | 0 |
| 13. Total alkalinity | 112.0 | 92.0 | −17.8 | 140. 50. | −64.3 |  |
| 14. Carbonate |  |  |  | 0 |  |  |
| 15. Bicarbonate |  |  |  | 140. | 50. | −64.3 |
| 16. Total hardness | 140. | 50. | −64.3 | 70.0 | 200.0 | 185.7 |

-continued

| | 60 hrs. at 5 Gal/min. SO₂ at pH 2.5 | | | 50 hrs. at 5 Gal/min. SO₂ at pH 3.0 | | |
|---|---|---|---|---|---|---|
| | initial | Final | Change % | initial | Final | Change % |
| 17. Conductivity | 315. | 240 | −23.8 | 520. | 550. | 5.8 |
| 18. Suspended solids | 32.0 | 0 | −100 | 77. | 20. | −74 |
| 19. B.O.D. | 326.9 | 6.7 | −98. | | | N.G. |
| 20. C.O.D. | 680. | 318 | −56 | | | N.G. |
| 21. Dissolved oxygen | 0 | 6.3 | | 0 | 0 | |
| 22. Turbidity | 50. | 5. | −90 | 50. | 5 | −90 |
| 23. Dissolved Solids | 80. | 460. | 173.9 | 197. | 208.5 | .6 |
| 24. Total Solids | | | | 231.0 | 213.5 | −7.5 |
| 25. Aluminum | 0.1 | 0 | −100 | 0.1 | 0.1 | 0 |
| 26. Silica | 10. | 3. | 70.0 | 15. | 27. | 8. |
| 27. Coliform bacillus | | 0 | | 2300 | 220 | N.G. |

Since the total dissolved solids are greatly increased by depressing the pH below 3 and also the quantities of reagents required for such purpose are much greater, there have long been very good reasons to avoid employing such procedure, particularly in the absence of any offsetting benefits. Thus pH 2.5 requires 2 lbs. SO₂ gas and 2 lb. lime/1000 gal. water, while pH 3 requires one fifth of each of these amounts. Hence it was highly unexpected and beneficial to discover that a comparatively small lowering of the operating acidity would yield such changed results. This is regardless of the described exclusion of oxygen from the iron reaction chamber or use of the mixing spheres which may further increase the efficiency by about 10%. However barium injection and use of ozone decreases the total dissolved solids by 50%.

OZONE GENERATION

One convenient form of ozone-generator may comprise a source of electric voltage applied to electrodes that impress the electric voltage across a stream of gas containing air or oxygen, the magnitude of the electric voltage and the volumetric flow of gas establishing the amount of ozone that is generated. Higher electric voltages and larger streams of gas tend to generate more ozone.

Figures 8, 9:
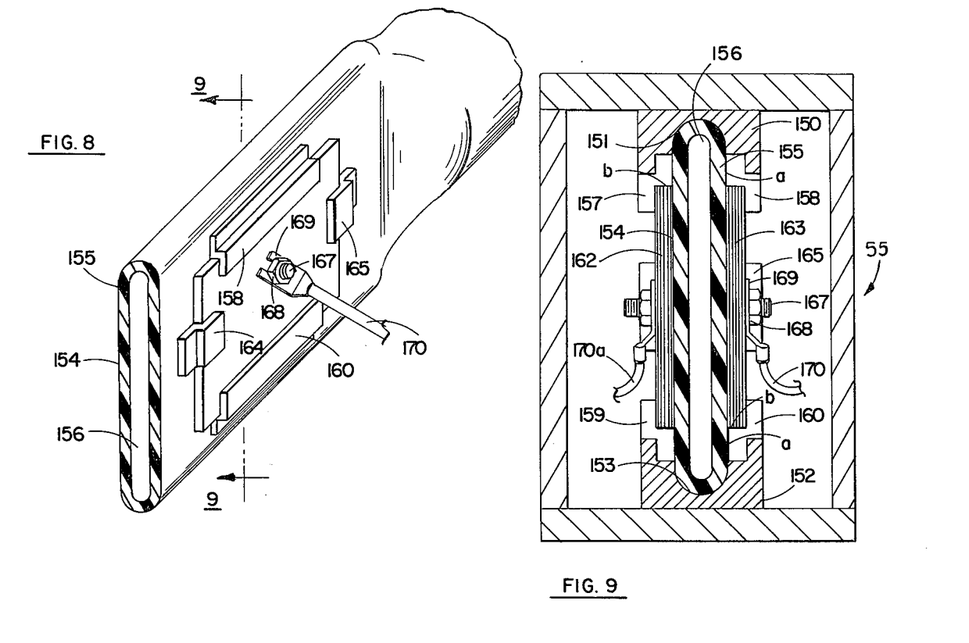
FIG. 8 is a perspective view of the ozone generator.
FIG. 9 is a vertical sectional view along line 9—9 of FIG. 8.
Figure 10:
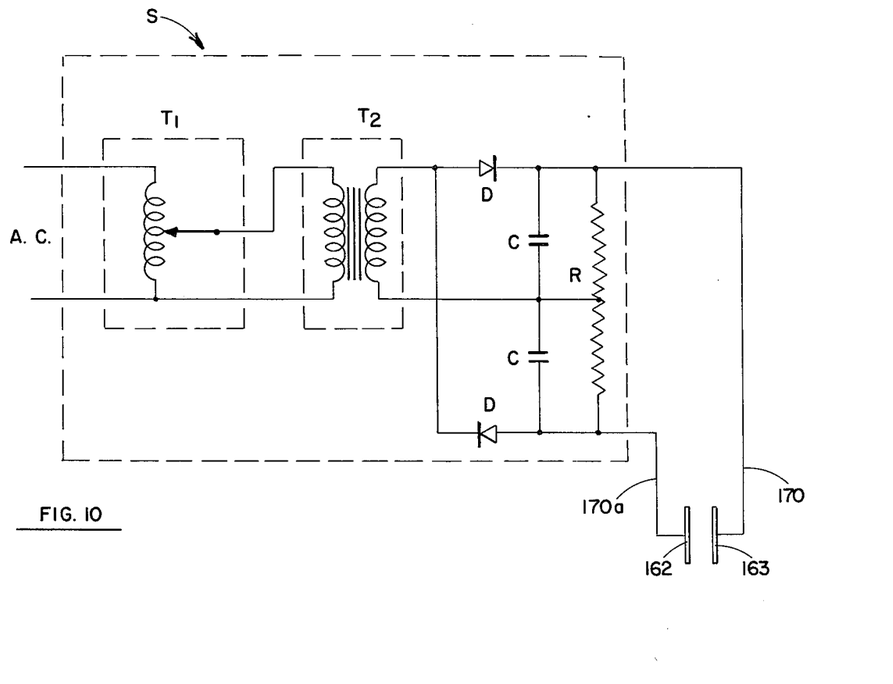
FIG. 10 is a schematic electical diagram of the same.

The ozone generator 55 of FIGS. 8–10 is constructed with a pair of parallel support frames 150, 152 each formed with a mutually facing, elongated, transversely arcuate groove 151, 153, which in assembly receive the opposite edges of a laterally compressed tube 155 the internal passage 156 of which serves as a gas flow duct or air conduit. The tube may be of rubber-like material or synthetic plastic such as teflon or polyvinyl chloride so that its natural resilience or tendency to resume a spherical shape causes it to seat or anchor firmly both in the positioning groove and against an electrode.

Adjacent the mouth of each groove are located an opposing pair of channel members 157, 158, 159, 160 formed of nonconductive material with one face *a* disposed in conforming juxtaposition with the outside 154 of the tube 155 and a parallel, outstepped segment forming a slide channel *b*. Each corresponding pair of channels *b* of the two support frames 150, 152 jointly receive and retain a flat-faced, generally rectangular conductor plate or electrode 162, 163 in friction registration with the outer face 154 of the tube 155. Copper electrodes are very satisfactory, but other conductors could be used. The plates may be additionally anchored by hold-down clamps 164, 165 cemented to the tube face at each end of a plate.

A threaded stud 167 carrying a lock nut 168 projects outward from each plate for attachment of a coupling 169 of an electric cable 170. The respective cables 170, 170a are connected to a high voltage source S. Volume or rate of gas flow through the tube passage 156 is controlled by the pump 51, and the quantity of ozone produced varies both with the gas flow and the magnitude of electric voltage (each of which can be regulated) as well as with the area and proximity of the spaced electrodes and the effective cross-section of the gas stream; the latter factors generally remain fixed once their value has been selected for a unit, so that variation in ozone production is then obtained by regulation of gas flow and/or voltage.

Voltage source S may be of the type that produces an adjustable voltage, as suggested above, for controlling the production of ozone. One such adjustable voltage source is shown in FIG. 10. Here an adjustable transformer T1, such as a "Variac", has its input terminals connected to an alternating-current power line. The variable output-voltage of the adjustable transformer T1 may be applied to a high voltage transformer T2, whose output-voltage is rectified by diodes D. A load register R and capacitors C are used to stabilize the output-voltage of the high voltage transformer T2. In this way, source S applies a stabilized voltage over cables 170, 170a to the electrodes 162 and 163. Moreover, by adjusting the adjustable transformer T1, the applied voltage to the electrodes may be varied.

Voltage source S is used as follows. Adjustable transformer T1 is, typically, able to produce an output-voltage that is variable from zero volts to about 125 percent of the voltage at the alternating-current power line; the output-voltage of the adjustable transformer T1 being applied to the primary, or input winding of the high voltage transformer T2. Due to the ratio of the number of turns of wire in the primary winding to the number of turns of wire in the secondary winding, transformer T2 transforms its relatively-low input-voltage to a relatively-high output voltage. This controllable relatively-high output voltage from the secondary winding of transformer T2 is applied to the electrodes 162 and 163, as discussed above.

The load resister R assumes a more constant load for the high-voltage transformer T2, and thus for the electrodes 162 and 163. Capacitors C are electrically connected across the load resistor R to further stabilize the relatively high voltage impressed across the electrodes 162 and 163.

Where it is deemed advantageous, the high voltage applied to the electrodes may be converted to the direct-current type by the use of suitable rectifying diodes D, these having the characteristics that they cause the electricity from transformer T2 to flow in only one given direction. Thus, a high D.C. voltage may be applied to the electrodes 162 and 163.

In this way, adjusting the adjustable transformer T1 causes a variation of the voltage impressed across the electrodes; and since the gas flows in a film-like configuration in the space between the electrodes, the gas is thus exposed to the high voltage. Thus, the amount of ozone that is produced by the ozone generator may be controlled by varying the applied voltage and/or by controlling the rate of gas flow.

Without necessarily wishing to be committed to a particular theoretical explanation, it is speculated that the unusual ozone-producing effectiveness of the present construction may be due to the combination of physical damping provided by the resilient tube wall frictionally and resiliently pressed against the face of the electrode plate plus the relatively high dielectric property of the material of the polymeric wall, which dual factors result in the production of a powerful field force without the occurrance of arcing or sparking. Absence of the latter also restrains a possible temperature elevation and the location of the tube shields the electrodes from attack by the ozone thus formed. The material of the tube 155 is high molecular weight natural and/or synthetic polymers commonly termed "Plastics". Comparison of dielectric strength of such polymeric resins may be made by A.S.T.M. test method D 149. By this method a minimum of about 800 volts/mil for ⅛ in. thickness resin is desirable. Preferred resins which meet or surpass such standard include ionomers, polyallomers, polyethylene copolymers, and chlorinated polyvinyl chloride. A tube thickness of about ¼ to ⅜ inch or more is applicable, dependng on the diameter of the tube.

SULFUR DIOXIDE GENERATION

Figures 2, 2A:
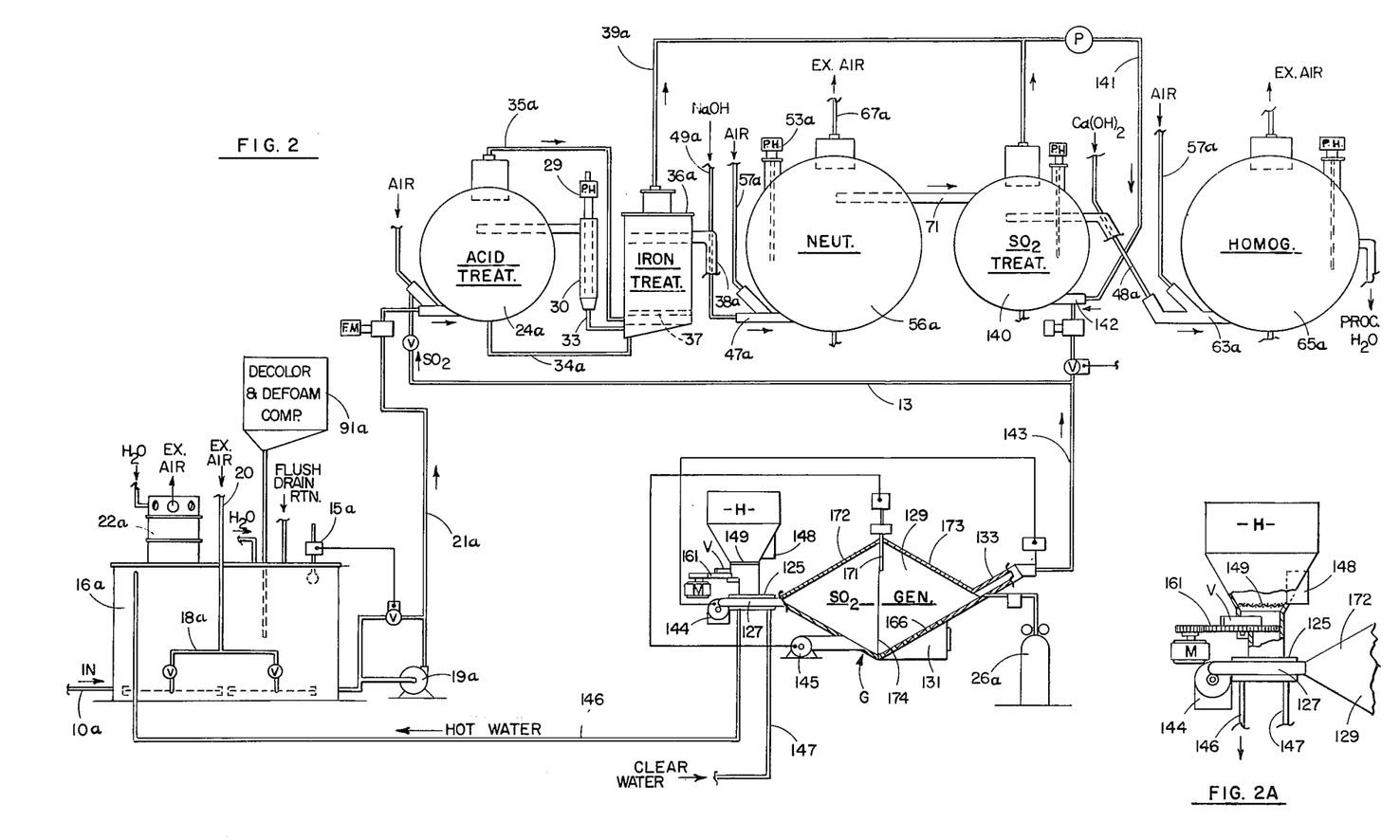
FIG. 2 is a schematic representation of the initial elements of apparatus, somewhat modified for initially highly acidic material and showing the new $SO_2$ generator connected thereto.
FIG. 2a is an enlarged construction detail of part of the generator.
Figure 3:
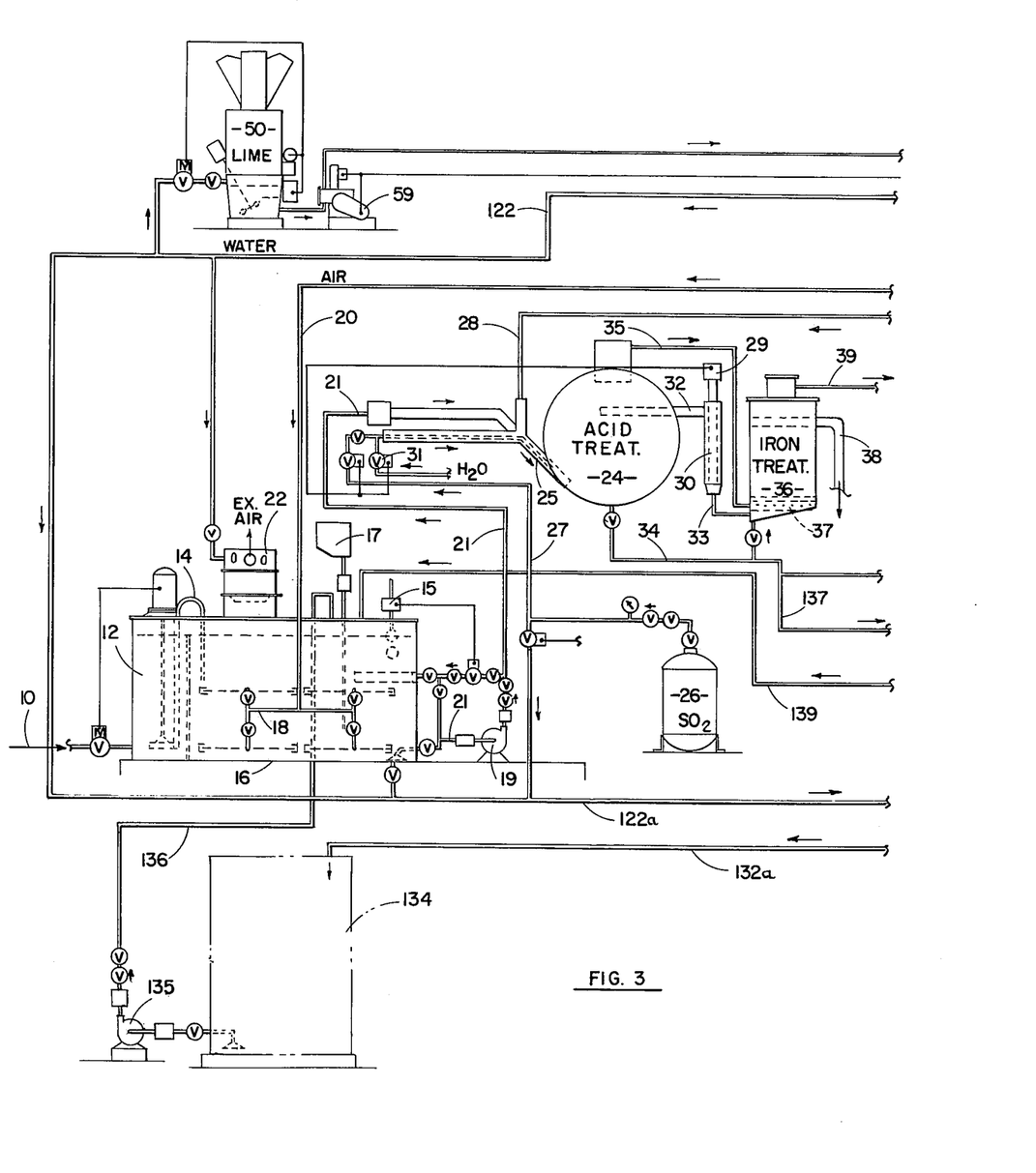
FIGS. 3, 4, 5 and 6 are laterally-related segments of the composite apparatus using the process of FIG. 1, semi-schematically.

The sulfur dioxide generator G of FIG. 2 provides a moisture-proof hopper H adapted to hold a supply of elemental sulfur in powdered form. A slowly rotating, apertured metering disk 161 driven by a motor M allows a small flow of powdered sulfur, after passing through a vibrating screen or sifter 149 to drop into a transverse delivery nozzle or fluid passage 127. A skimmer or slidable valve member V permits variance of the feed rate or aperture size of the disk 161. An electric vibrator 148 secured to the side wall of the hopper, simultaneously vibrates the hopper and the sifter 149. One end of the fluid passage 127 is supplied by an air blower 144 and the opposite or outlet end opens into a combustion chamber 129 which is shaped to promote or create turbulence of the several fluid currents injected therein and which it is desired to intimately intermingle.

A gas burner 145 injects burning gas into the chamber 129 where it ignites the turbulent mixture of sulfur dust and gaseous oxygen to produce sulfur dioxide (which is withdrawn from the outlet mouth 133) and sulfurous slag which drops through a perforated wall 166 into a collection area or chamber 131. The rate at which the blower 144 delivers air and sulfur particles is electronically regulated by a temperature sensor 171 within the combustion chamber. The flow rate is usually within the range of about one to about 20 lbs. of powdered sulfur per minute.

The fluid passage 127 is centered within a generally cylindrical water jacket 125 through which circulation is supplied by the conduit 147 and drained therefrom by the line 146 which conveys the heated water to the holding tank 16a. The function of the cooling jacket is to maintain the powdered sulfur well below its melting point so that the particles do not coalesce and are thus "individually" conveyed into the combustion chamber in admixture with the oxygen of the air blower. Typically the jacket maintains a temperature of about 90°–95° F. as contrasted with a combustion chamber temperature of about 450° F (or an overall range of about 200° to about 600° F.) Likewise the jacket prevents the burning zone from striking back or extending into the fluid passage 127 and thence to the storage hopper. The gas burner 145 is also electronically responsive to sulfur dioxide pressure at outlet 133.

The desired turbulence of the combustion chamber 129 is obtained in the illustrated embodiment by constructing it from two similar size, conic sections 172, 173 (such as spun metal) and welding their larger ends together for a use-position in which they would be oppositely oriented along a generally horizontal axis, that is, securing the peripheral edges together along the line 174 (FIG. 2). However, other chamber configurations can be used, generally characterized by a central bulge and distant more-or-less angular end walls which (like 166 and 173) reflect back in a mingling pattern, the two gas streams which have been introduced (from 127 and 145) at laterally separated inlets.

MODIFICATION FOR HIGHLY ACIDIC EFFLUENTS

The sulfite treatment procedure as shown in FIG. 2 is similar to that earlier detailed for sewage treatment and the like, except that when the flow stream is already near or below pH 2.5 as previously noted, acidity monitor and control mechanism for sphere 24a would not trigger the appreciable addition of much more, if any, sulfur dioxide. Accordingly the closed circulatory system is operated on the basis of saturating the feed stock with $SO_2$ supplied by line 13. The effluent feed stream then continues through the iron treatment chamber 36a into the neutralizer sphere 56a, where it is churned by air stream from line 57a and neutralized with sodium hydroxide through line 49a in response to pH sensor 53. The neutralized flow then passes through conduit 71 to sulfur dioxide sphere 140 where gas from the closed circuit $SO_2$ circulation system 141 is introduced through nozzle 142 to maintain a pH of about 2.5. The latter is also connected to an $SO_2$ supply source or to the generator G by conduit 143. It will be seen that integrated apparatus is here provided which continuously recycles its own treating components in relation to the travelling feed stock which is being acted upon and purified by passage through the system. In addition, within the overall system, there is a smaller closed system of continuously circulating sulfur dioxide (in an oxygen-free or oxygen-exhausted environment) as defined by the conduits 28, 35, 39, 43, 66 plus the air inlet/filter unit 46 and blower 23. To this gas system the reservoir 26 supplies additional sulfur dioxide to replace that used up, so as to maintain a predetermined acidity in the primary reaction chamber 24. Continuous mineral-ionization control through successive treatment steps including neutralization, insures that the potentially solid components of the fluid flow will remain in suspension until deposited in the flocculation chamber, and will thereupon be completely withdrawn.

It is also important to observe that the system is adapted to clean or rejuvenate itself by means of the flow connections and control means provided, and at the same time take care of the waste products accumulated within the system. In other words, it handles its own waste rather than spewing it out to the environment. Thus, in addition to the backflow and drainage connections already enumerated, it will be seen that the primary acid treatment sphere 24 and its associated iron treatment chamber 36, plus the subsequent in-line spheres 56, 65, as well as the surge tank 86, are each separately connected by conduit 137, 137a to a flush pump 138 which by conduit 139 can return the fluid to the primary holding tank 16.

FLAT-WALL RECTANGULAR HOUSING ASSEMBLY FOR PRIMARY UNITS

Figure 11:
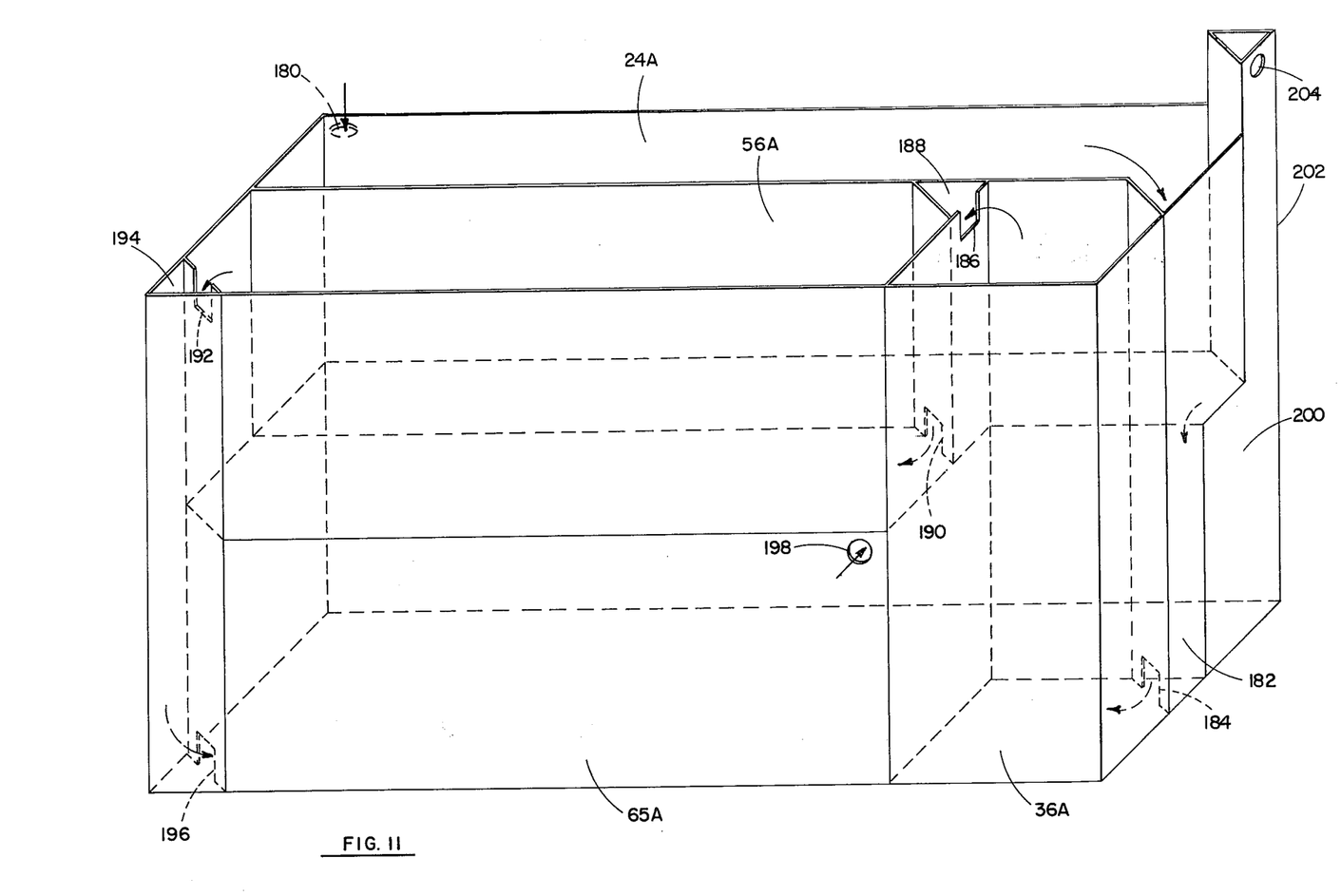
FIG. 11 is a semi-schematic perspective, with top removed, of an alternate, flat-panel housing assembly for the primary units.

The construction illustrated in FIG. 11 provides a composite construction for locating the primary treating units in modular cells formed of flat-wall rectangular panels of metal or plastic, which can be shipped in knocked-down form and assembled at a use-site together with the reagents, pumps, monitoring units, etc. Such small compact assembly is particularly adapted for installation—which may necessarily be temporary or on a rental basis—in a limited space such as a cabin cruiser, highway vehicle, comfort station such as forest, park, beach, or construction site, field hospital, migratory labor camp, transitory monitoring or marshalling area, etc. Dimensions of a typical sewage treating assembly of this kind are 6 feet high, 6 feet wide and 12½ feet long. Although the advantages of the spherical (cyclone) mixing tanks (24, 56, 65) are thus passed up by such rectangular construction, the careful or strict hydrogen ion control at successive steps and the exclusion of oxygen from the iron catalyst bed ensures successful operation for a primary period.

Flowable matter is pumped or flowed through inlet 180 into an elongated $SO_2$ treatment chamber 24A. By turbulence created by the pump action, it moves lengthwise (in combination with the sulfur dioxide or acid) to the distal end of the chamber and then drops through a triangular-shaped descending passage 182 to pass through an aperture 184 into an iron catalyst chamber 36A where it percolates upward theough a bed of iron pieces (not shown) to pass over a weir 186 and thence through a triangular-shaped descending passage 188 having a lower, side outlet 190 to the neutralizing tank 56A. From here the flow passes over a weir 192 and descends through a triangular-shaped passage 194. Through a lower aperture 196 it enters the homogenizing tank 65A and leaves the latter by outlet 198. The chamber 200 with upstanding, triangular column 202 and outlet 204 serves as a water storage chamber.

Since the outflow from homogenizer outlet 198 is sterile, it may be handled in various ways including continuing with all of the process steps shown in FIG. 1 following the homogenizer 65. However, such subsequent treatment will vary with environmental circumstances. On a highway vehicle, such outflow will be stored until the vehicle reaches a discharge station, which may or may not have a flocculation tank. At sea or in the wilderness, the whole output may simply be discharged when there is no need to reclaim the water and no facilities to separate and dry the sludge.

1. Apparatus for obtaining purified water and solid components from aqueous feedstock containing oxidizable contaminants, comprising:
    a closed reaction chamber characterized by a physical structure adapted to effect continuous turbulence of a flowsteam moved therethrough and including a generally spherical, sealed vessel having a tangentially directed liquid inlet near the bottom thereof, a liquid outlet spaced therefrom, and a gas outlet near the top;
    a second sealed treating vessel containing a porous bed formed of pieces of metallic iron, said vessel being connected to the liquid outlet and to the gas outlet from said spherical vessel so as to convey the fluid from both of said outlets through said bed;
    conduit and pump means for continuously circulating a gaseous stream of oxygen-free sulfur dioxide through said two vessels in succession and through a closed return path formed partially outside said vessels in contact with a source of pressurized sulfur dioxide;
    successive flow-controlled neutralizing and flocculating vessels connected to said second treating vessel for receiving the treated feedstock flow stream therefrom and adapted for separating purified water and solid components, said neutralizing vessel comprising a successive pair of generally spherical, sealed vessels, each having a tangentially directed, liquid inlet near the bottom thereof;
    an ozone generator and means for passing a stream of ozone gas from said generator through each of said sealed vessels in intimate admixture with the treated feedstock;
    a sealed preliminary holding tank located anterior to and flow connected to said first spherical vessel, means for circulating exhaust gas through said holding tank drawn from said pair of spherical neutralizing vessels, and means for controlled filtered venting of gas from the holding tank.

2. Apparatus according to claim 1 which additionally includes a vessel for holding purified water separated from said flocculating vessel and means for passing a stream of ozone gas from said ozone generator successively through said holding vessel and through said preliminary holding tank.

3. In an apparatus for obtaining purified water and solid components from aqueous feedstock containing oxidizable contaminants, wherein said apparatus includes a closed reaction chamber having means associated therewith for effecting turbulence of a flowstream of said feedstock moved therethrough, a liquid inlet to said chamber, a liquid outlet spaced therefrom, and a gas outlet, a sealed treating vessel having a liquid inlet connected to the liquid outlet of the reaction chamber for receiving feedstock therefrom, said treating vessel containing a porous bed of metallic iron and having a liquid outlet spaced from the liquid inlet for flow of the liquid through the porous bed, and successive flow-controlled neutralizing and flocculating vessels connected to said treating vessel for receiving treated feedstock therefrom and having means for separating purified water and solid components, the improvement comprising: conduit and pump means connected with the chamber and treating vessel and connected with a source of gaseous sulfur dioxide for circulating an oxygen-free gaseous stream of sulfur dioxide through said chamber and treating vessel in succession and through a closed return path partially outside said vessels to maintain a predetermined pH of the feedstock and to prevent clogging of the porous bed of metallic iron with oxidized precipitates.

4. Apparatus according to claim 3 which additionally includes an ozone generator, and said neutralizing vessel comprises a successive pair of generally spherical, sealed vessels, each having a tangentially directed, liquid inlet near the bottom thereof, and means for passing a stream of ozone gas from said ozone generator through each of said sealed vessels in intimate admixture with the treated feedstock.

5. Apparatus according to claim 4 which additionally includes a pair of filter units each connected alternately to receive liquid outflow from said flocculating vessel, filtered water storage means connected to said filter units, and conduit and control means for selectively stopping flow through each of said filter units in turn, and backflushing the stopped unit with water from said storage means.

6. Apparatus according to claim 3 which includes means for selectively introducing sodium hydroxide and calcium hydroxide into said neutralizing vessel, and said flow stream includes means for introducing barium ions thereto anterior to said flocculation vessel.

7. Apparatus according to claim 6 which additionally includes an ozone generator and said neutralizing vessel comprises a generally spherical, sealed vessel having a tangentially directed, liquid inlet near the bottom thereof, and means for passing a stream of ozone gas from said ozone generator through said vessel in intimate admixture with the treated feedstock.

8. Apparatus according to claim 7 which includes means for selectively introducing sodium hydroxide and calcium hydroxide into said neutralizing vessel, and said flow stream includes means for introducing barium ions anterior to said flocculation vessel.

9. Apparatus according to claim 6 which additionally includes a non-sparking ozone generator comprising in combination:
- a gas flow channel formed between opposing faces of generally parallel walls of electrically insulating material spaced apart a substantially uniform distance and having a minimum dielectric strength of about 800 volts/mil;
- a pair of conductor plates disposed adjacent the outer faces of said channel-forming walls, generally parallel to each other and to said walls, and separated from the gas flow of said channel;
- means for imposing an electric field force on the gas in said flow channel intemediate said conductor plates, by application of a selected electric voltage to said conductor plates; and
- means for moving a controlled-volume flow of a gas containing oxygen through the electric field in said channel whereby ozone is produced therein by action of said field force.

10. Apparatus according to claim 3 which additionally includes a non-sparking ozone generator comprising in combination:
- a gas flow channel formed between opposing faces of generally parallel walls of electrically insulating, resilient, high polymeric material spaced apart a substantially uniform distance;
- a pair of conductor plates frictionally disposed adjacent the outer faces of said channel-forming walls, generally parallel to each other and to said walls and separated from the gas flow of said channel;
- means for imposing an electric field force on the gas in said flow channel intermediate said conductor plates, by application of a selected electric voltage to said conductor plates; and
- means for moving a controlled-volume flow of a gas containing oxygen through the electric field in said channel whereby ozone is produced therein by action of said field force.

11. Apparatus according to claim 3 which additionally include a sulfur dioxide generator comprising in combination:
- container means adapted to hold a supply of solid, dispersable sulfur and having metering means disposed adjacent an outlet;
- a fluid passage leading from said outlet;
- vibratory grid means disposed to screen sulfur for movement along said fluid passage;
- operating means to effect controlled flow of discrete sulfur particles out of said fluid passage;
- a closed combustion chamber adapted to effect tumultuous movement of combustible fluid mixtures therein, being disposed to receive the flow from said fluid passage and having sulfur dioxide gas outlet means;
- blower means adapted to move oxygen containing gas through said fluid passage into said combustion chamber in admixture with the flow of sulfur particles;
- means for injecting burning gas into said combustion chamber in quantity adapted to initiate and maintain combustion of said flow of sulfur particles and oxygen-containing gas; and
- means for cooling said fluid passage to prevent coalescence of sulfur particles and the spread of combustion thereinto from the combustion chamber.

12. Apparatus according to claim 3 wherein said closed reaction chamber and the sealed treating vessel plus said neutralizing and flocculating vessels are each externally formed of generally flat-wall rectangular panels adapted for shipping in disassembled form and on-site fabrication to form a composite edge-joined assembly.

13. Apparatus as in claim 3, wherein a pH monitor is connected with said liquid outlet from the reaction chamber and is also connected with flow control means to control the introduction of sulfur dioxide to said feedstock moved through said reaction chamber.

14. Apparatus as in claim 13, wherein the reaction chamber is spherical and the inlet thereto for the feedstock is disposed tangentially to the chamber for imparting continuous turbulence to the feedstock introduced into the reaction chamber.

15. Apparatus as in claim 13, wherein the reaction chamber is rectangularly shaped, and the means for effecting turbulence of the feedstock therein comprises pump means connected to introduce the feedstock into the reaction chamber under pressure.

16. A corona-free ozone generator, comprising a pair of planar, spaced apart walls of dielectric material having outer surfaces and opposed inner surfaces defining a flow channel therebetween for flow of a gas containing oxygen, a plate electrode positioned at the outer surface of each wall in parallel relation thereto and contiguous therewith, means connected with the electrodes for producing an electric field across said flow channel between the walls, and means for effecting flow of said gas through said flow channel and for confining the flow to said flow channel between the opposed inner surfaces, thus preventing contact between the electrodes and said gas, for corona-free production of ozone when the electric field is established.

17. An ozone generator according to claim 16 wherein said parallel, spaced walls of dielectric material are formed by a length of resilient tubing which is laterally compressed to form said flow channel, by pressure of said conductor plates disposed against the outer surfaces thereof, said material having a minimum dielectric strength of about 800 volts/mil.

18. An ozone generator according to claim 16, which additionally includes upstream means for passing said gas flow through an adsorption unit of limewater whereby carbon monoxide, carbon dioxide and bicarbonate may be removed from an air stream or the like prior to its passage between said conductor plates.

19. An ozone generator according to claim 16 wherein said electric field is applied by a high-voltage Variac-type transformer and said conductor plates are formed essentially of copper, and said polymeric material comprises polyvinyl chloride.

20. A sulfur dioxide generator, comprising hopper means for holding a supply of particulate sulfur, a combustion chamber, conduit means connected with said hopper means and with said combustion chamber for conveying particulate sulfur from the hopper means to the combustion chamber, said conduit means including a nozzle communicating with said combustion chamber and connected with a source of air under pressure whereby said particulate sulfur is conveyed by said high pressure air through the conduit means and nozzle into the combustion chamber, valve means in said conduit means for controlling the flow of particulate sulfur from the hopper means into the conduit means and to the nozzle, means for igniting the particulate sulfur conveyed into the combustion chamber to produce gaseous sulfur dioxide, and outlet means to convey the sulfur dioxide gas from the combustion chamber.

21. A sulfur dioxide generator according to claim 20, wherein said combustion chamber is shaped like a pair of conic sections, oppositely oriented along a generally horizontal alignment axis with their larger ends disposed in mutual edge abutment and their respective apices traversed respectively by said nozzle and said sulfur dioxide gas outlet means.

22. A sulfur dioxide generator according to claim 21 wherein the conic section opposite the inlet of said nozzle has a perforate lower wall to permit passage therethrough of slag sulfur formed in the combustion chamber.

23. A sulfur dioxide generator as in claim 20, wherein said means for igniting the sulfur is burner means in communication with said combustion chamber to introduce flame into said combustion chamber in an amount sufficient to initiate and maintain combustion of the sulfur.

24. A sulfur dioxide generator as in claim 20, wherein a vibratory grid means is positioned to screen particulate sulfur discharged from the hopper means to the conduit means, and operating means connected to simultaneously vibrate the hopper means and grid means to effect controlled flow of discrete sulfur particles out of said hopper means.

25. A sulfur dioxide generator as in claim 20, wherein cooling means is operatively associated with said conduit means to prevent coalescence of sulfur particles therein.

* * * * *

UNITED STATES PATENT OFFICE
CERTIFICATE OF CORRECTION

Patent No. 3,948,774　　　　　　　　Dated April 6, 1976

Inventor(s) William Edward Lindman

It is certified that error appears in the above-identified patent and that said Letters Patent are hereby corrected as shown below:

Column 15, line 33, "7" should read --- 1 ---.

Signed and Sealed this

Ninth Day of November 1976

[SEAL]

Attest:

RUTH C. MASON
*Attesting Officer*

C. MARSHALL DANN
*Commissioner of Patents and Trademarks*